US012695886B2

(12) United States Patent
Naser et al.

(10) Patent No.: US 12,695,886 B2
(45) Date of Patent: Jul. 28, 2026

(54) TEMPLATE MATCHING PREDICTION FOR VIDEO ENCODING AND DECODING

(71) Applicant: INTERDIGITAL CE PATENT HOLDINGS, SAS, Paris (FR)

(72) Inventors: Karam Naser, Mouazé (FR); Fabrice Le Leannec, Betton (FR); Tangi Poirier, Thorigné-Fouillard (FR); Gaëlle Martin-Cocher, Toronto (CA)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 156 days.

(21) Appl. No.: 18/282,808

(22) PCT Filed: Mar. 22, 2022

(86) PCT No.: PCT/EP2022/057416
§ 371 (c)(1),
(2) Date: Sep. 19, 2023

(87) PCT Pub. No.: WO2022/207400
PCT Pub. Date: Oct. 6, 2022

(65) Prior Publication Data
US 2024/0171756 A1     May 23, 2024

(30) Foreign Application Priority Data

Mar. 30, 2021   (EP) ..................................... 21305403
Jun. 29, 2021   (EP) ..................................... 21305892

(51) Int. Cl.
*H04N 19/176*     (2014.01)
*G06V 10/75*      (2022.01)
*H04N 19/436*     (2014.01)

(52) U.S. Cl.
CPC ......... *H04N 19/176* (2014.11); *G06V 10/751* (2022.01); *H04N 19/436* (2014.11)

(58) Field of Classification Search
CPC .... H04N 19/176; H04N 19/436; H04N 19/44; H04N 19/55; H04N 19/57; H04N 19/105; H04N 19/70
See application file for complete search history.

(56) References Cited

U.S. PATENT DOCUMENTS

| | | | | |
|---|---|---|---|---|
| 9,948,930 B2 * | 4/2018 | Panusopone | ......... | H04N 19/105 |
| 2009/0180538 A1 * | 7/2009 | Visharam | ............. | H04N 19/176 |
| | | | | 375/240.15 |

(Continued)

FOREIGN PATENT DOCUMENTS

| | | |
|---|---|---|
| WO | 2019190224 | 10/2019 |
| WO | 2019244669 | 12/2019 |
| WO | 2020001578 | 1/2020 |

OTHER PUBLICATIONS

Venugopal et al., CE8: Intra Region-Based Template Matching (Test 8.1), Joint Video Experts Team (JVET) of ITU-T SG 16 WP 3 and ISO/IEC JTC 1/SC 29/WG 11, 12th Meeting, Macao, CN, Oct. 3-12, 2018, Document: JVET-L0077_V2.

(Continued)

*Primary Examiner* — Jessica M Prince
(74) *Attorney, Agent, or Firm* — Ronald Kolczynski

(57) ABSTRACT

A method, apparatus or system for processing video information can involve determining a prediction block for a current block of picture information based on a comparison of a template associated with the current block to at least one other template associated with at least one other block in an area of decoded picture information, wherein the comparison is based on a constant number of comparisons per pixel independent of a size of the current block; and decoding/encoding the current block based on the prediction block.

4 Claims, 15 Drawing Sheets

(56) References Cited

U.S. PATENT DOCUMENTS

| | | | |
|---|---|---|---|
| 2019/0208217 A1 | 7/2019 | Zhou et al. | |
| 2020/0007888 A1 | 1/2020 | Xu et al. | |
| 2020/0021798 A1* | 1/2020 | Xu | H04N 19/176 |
| 2020/0021833 A1* | 1/2020 | Xu | H04N 19/176 |
| 2021/0274214 A1* | 9/2021 | Moon | H04N 19/107 |

OTHER PUBLICATIONS

Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, Document JVET-G1001-v1, 7th Meeting: Torino, Italy, Jul. 13, 2017, 48 pages.

Naser et al., EE2: Intra Template Matching, Document: JVET-V0130-v6, Joint Video Experts Team (JVET) of ITU-T SG 16 WP 3 and ISO/IEC JTC 1/SC 29, 22nd Meeting, by teleconference, Apr. 20-28, 2021.

Venugopal et al: "CE8 related: Intra Region-based Template Matching (Test 8.1)"; 11. JVET Meeting; Jul. 11, 2018-Jul. 18, 2018; (The Joint Video Exploration Team of ISO/IEC JTC1/SC29/WG11 and ITU-T SG.16); No. JVET-K0048-v1; Jul. 2, 2018.

Thygesen, Weighted Combination of Sample Based and Block Based Intra Prediction in Video Coding, 2016, Master's Theses in Mathematical Science 2016:E2, Mathematics Centre for Mathematical Sciences Lund University.

Naser, et al., Evaluation of Template Matching Prediction for VVC, Joint Video Experts Team (JVET) of ITU-T SG WP 3 and ISO/IEC JTC 1/SC 29, 21st Meeting, by teleconference, Jan. 6-15, 2021, Document: JVET-U0048.

* cited by examiner

0: Planar
1: DC

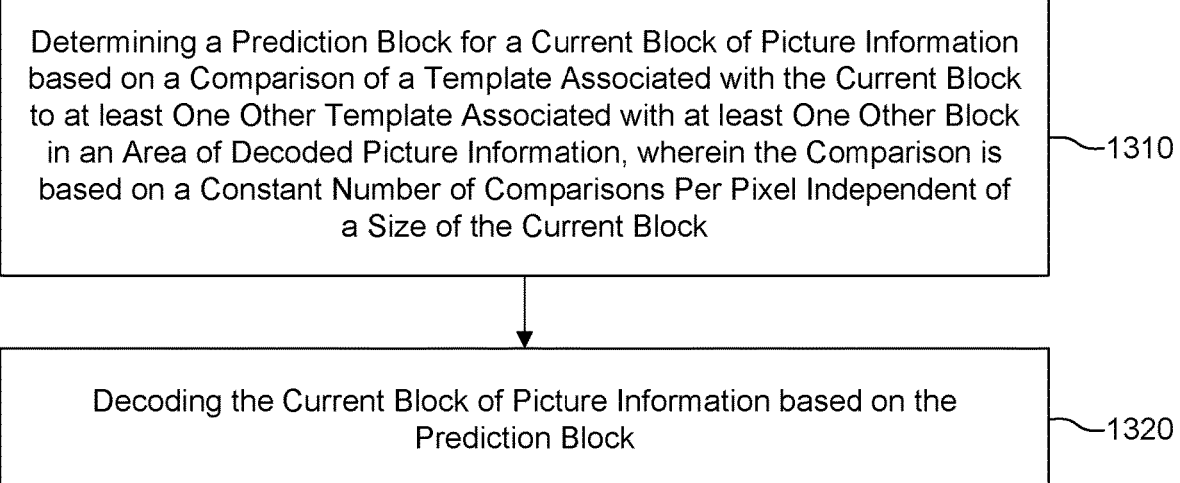

Determining a Prediction Block for a Current Block of Picture Information based on a Comparison of a Template Associated with the Current Block to at least One Other Template Associated with at least One Other Block in an Area of Decoded Picture Information, wherein the Comparison is based on a Constant Number of Comparisons Per Pixel Independent of a Size of the Current Block ~1310

Decoding the Current Block of Picture Information based on the Prediction Block ~1320

FIG. 13

TEMPLATE MATCHING PREDICTION FOR VIDEO ENCODING AND DECODING

CROSS REFERENCE TO RELATED APPLICATIONS

This application is a U.S. National Stage Application under 35 U.S.C. 371 of International Patent Application No. PCT/US2022/057416, filed Mar. 22, 2022, which is incorporated herein by reference in its entirety This application claims the benefit of European Application Nos. 21305403.4, filed Mar. 30, 2021 and application Ser. No. 21/305,892.8 filed Jun. 29, 2021 which is incorporated herein by reference in its entirety.

TECHNICAL FIELD

The present disclosure involves video compression.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original picture block and the predicted picture block, often denoted as prediction errors or prediction residuals, are transformed, quantized and entropy coded. To reconstruct the video, the compressed data is decoded by inverse processes corresponding to the entropy coding, quantization, transform, and prediction.

SUMMARY

In general, at least one example of an embodiment involves a method or an apparatus for video encoding or decoding comprising providing an intra prediction processing mode employing template matching prediction based on a search range determined as described herein.

At least one example of an embodiment can involve a method or an apparatus for video encoding or decoding comprising providing an intra prediction processing mode employing template matching prediction based on a template search having a fixed number of comparisons per pixel, regardless of block dimension.

At least one example of an embodiment can involve a method or an apparatus for video encoding or decoding comprising providing an intra prediction processing mode employing template matching prediction based on a template search having a fixed number of comparisons per pixel, regardless of block dimension, and modifying the search range such that parallel processing can be performed.

At least one example of an embodiment can involve apparatus comprising: one or more processors configured to determine a prediction block for a current block of picture information based on a comparison of a template associated with the current block to at least one other template associated with at least one other block in an area of decoded picture information, wherein the comparison is based on a constant number of comparisons per pixel independent of a size of the current block; and decoding the current block based on the prediction block.

At least one example of an embodiment can involve a method comprising: determining a prediction block for a current block of picture information based on a comparison of a template associated with the current block to at least one other template associated with at least one other block in an area of decoded picture information, wherein the comparison is based on a constant number of comparisons per pixel independent of a size of the current block; and decoding the current block based on the prediction block.

At least one example of an embodiment can involve apparatus comprising: one or more processors configured to determine a prediction block for a current block of picture information based on a comparison of a template associated with the current block to at least one other template associated with at least one other block in an area of reconstructed picture information, wherein the comparison is based on a constant number of comparisons per pixel independent of a size of the current block; and encoding the current block based on the prediction block.

At least one example of an embodiment can involve a method comprising: one or more processors configured to determine a prediction block for a current block of picture information based on a comparison of a template associated with the current block to at least one other template associated with at least one other block in an area of reconstructed picture information, wherein the comparison is based on a constant number of comparisons per pixel independent of a size of the current block; and encoding the current block based on the prediction block.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a computer program product storing program instructions that, when executed by a processor, are suitable for implementing one or more embodiments of methods described herein.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

The above presents a simplified summary of the subject matter in order to provide a basic understanding of some aspects of the present disclosure. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description provided below.

BRIEF DESCRIPTION OF THE DRAWING

The present disclosure may be better understood by consideration of the detailed description below in conjunction with the accompanying figures in which:

3

4

Figure 1:
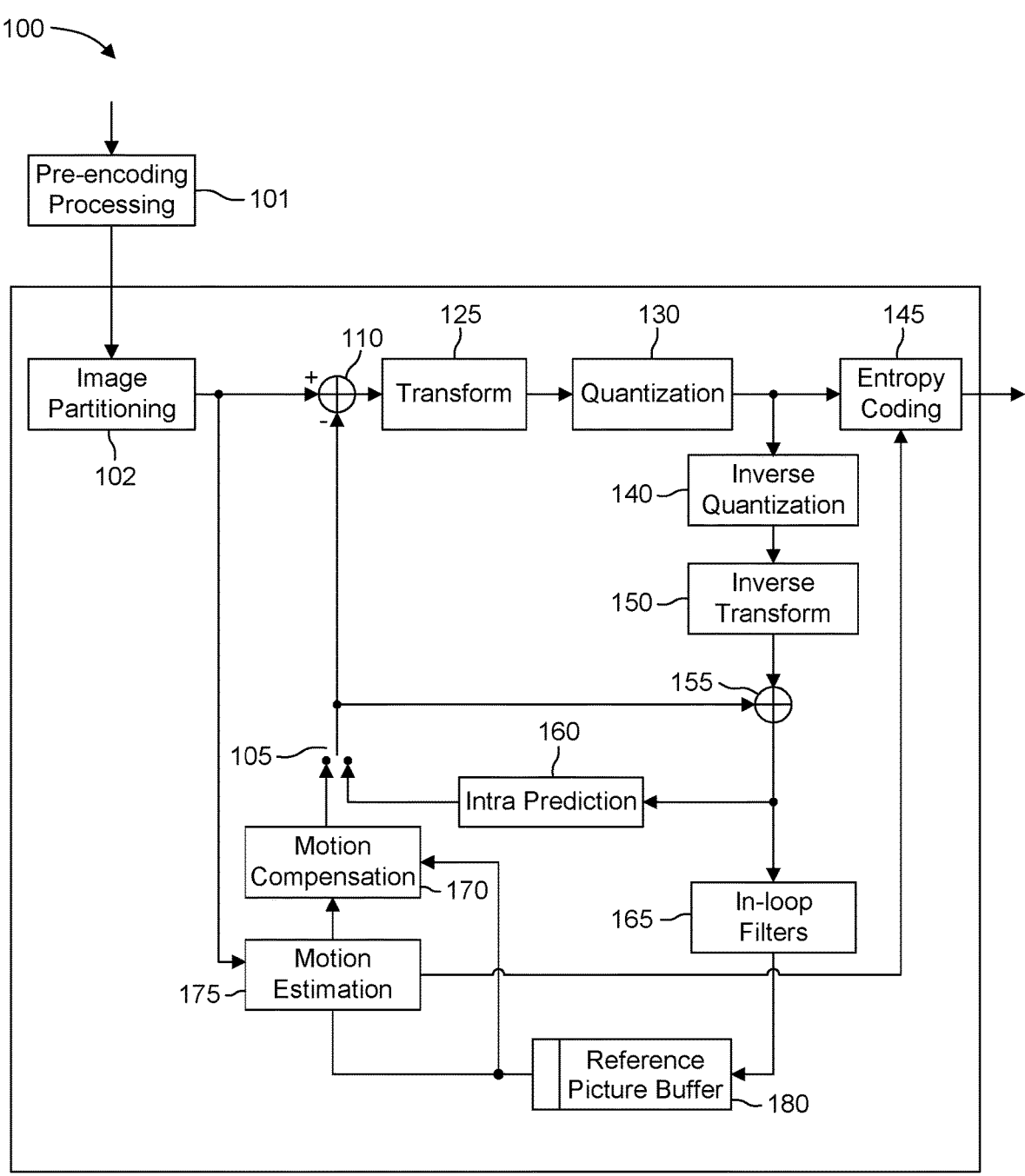
Figure 2:
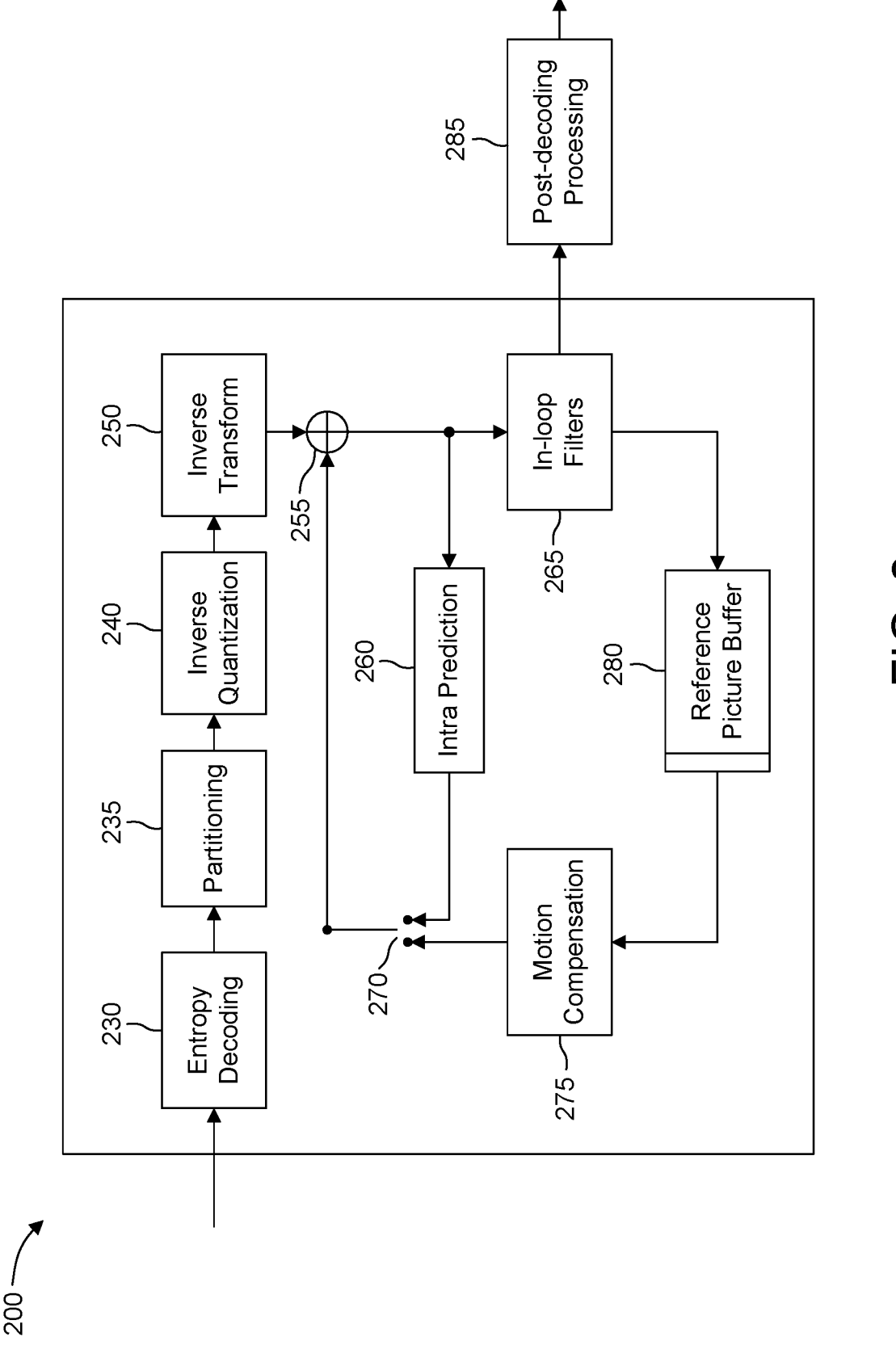
Figure 3:
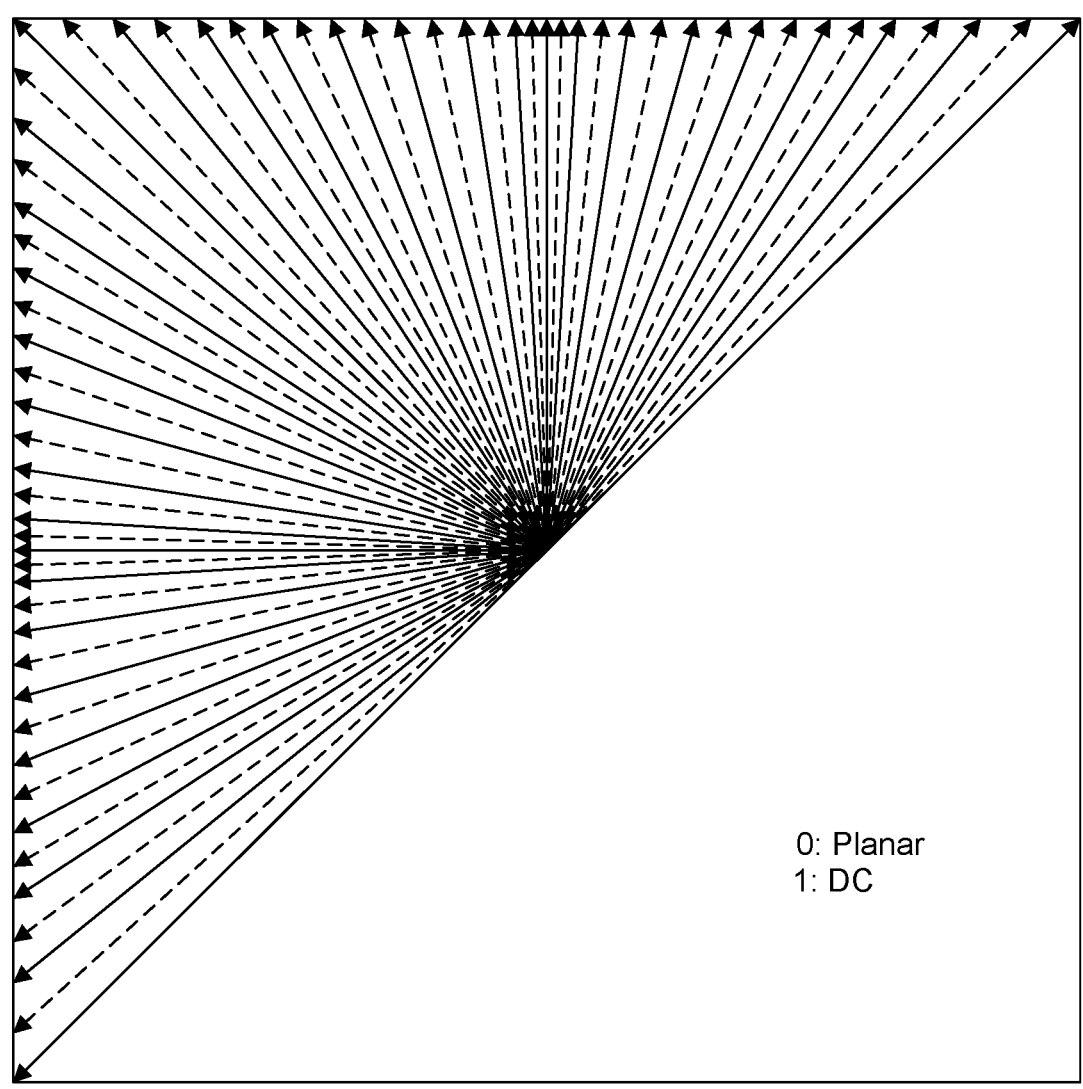
Figure 4:
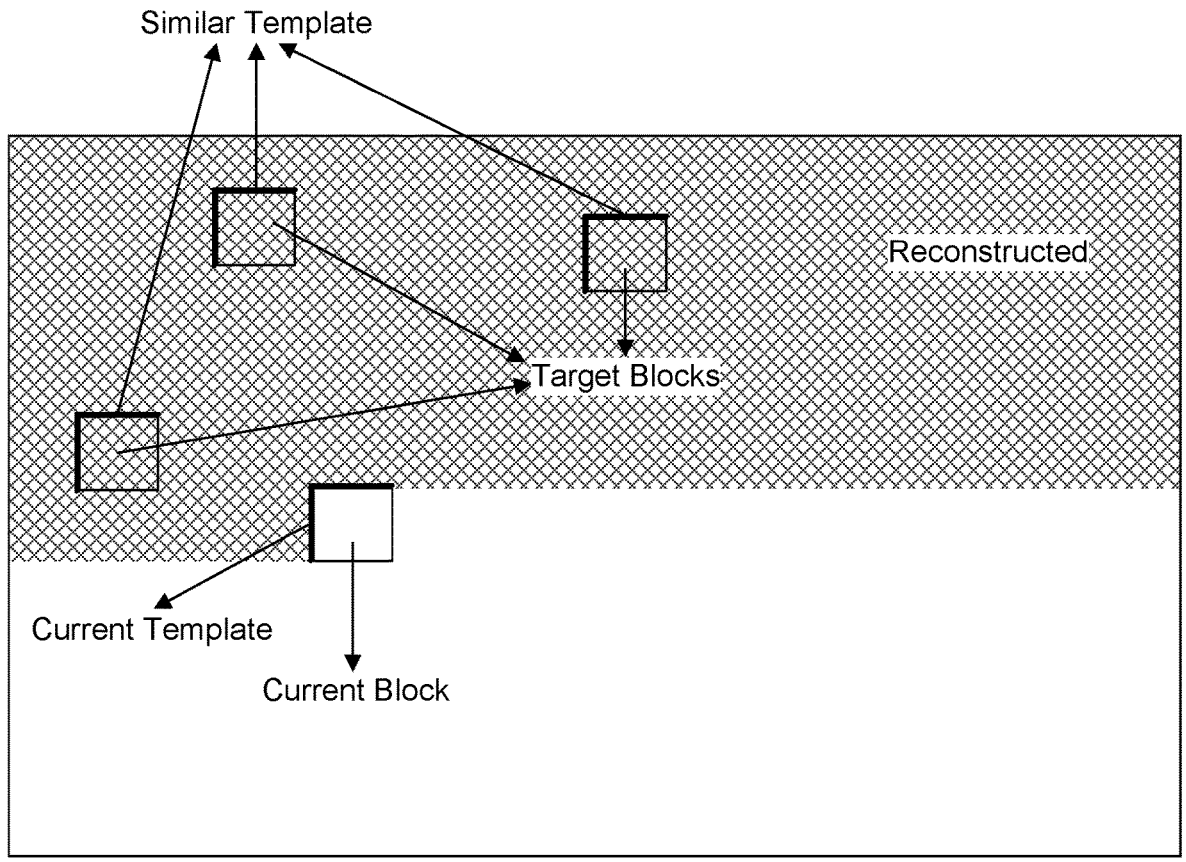
Figure 5:
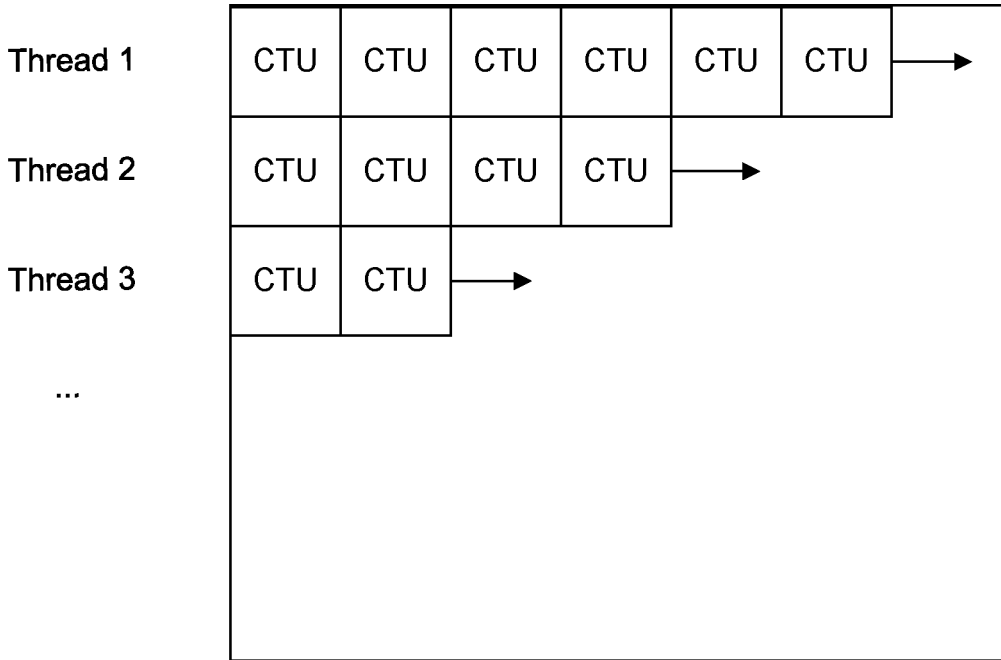
Figure 6:
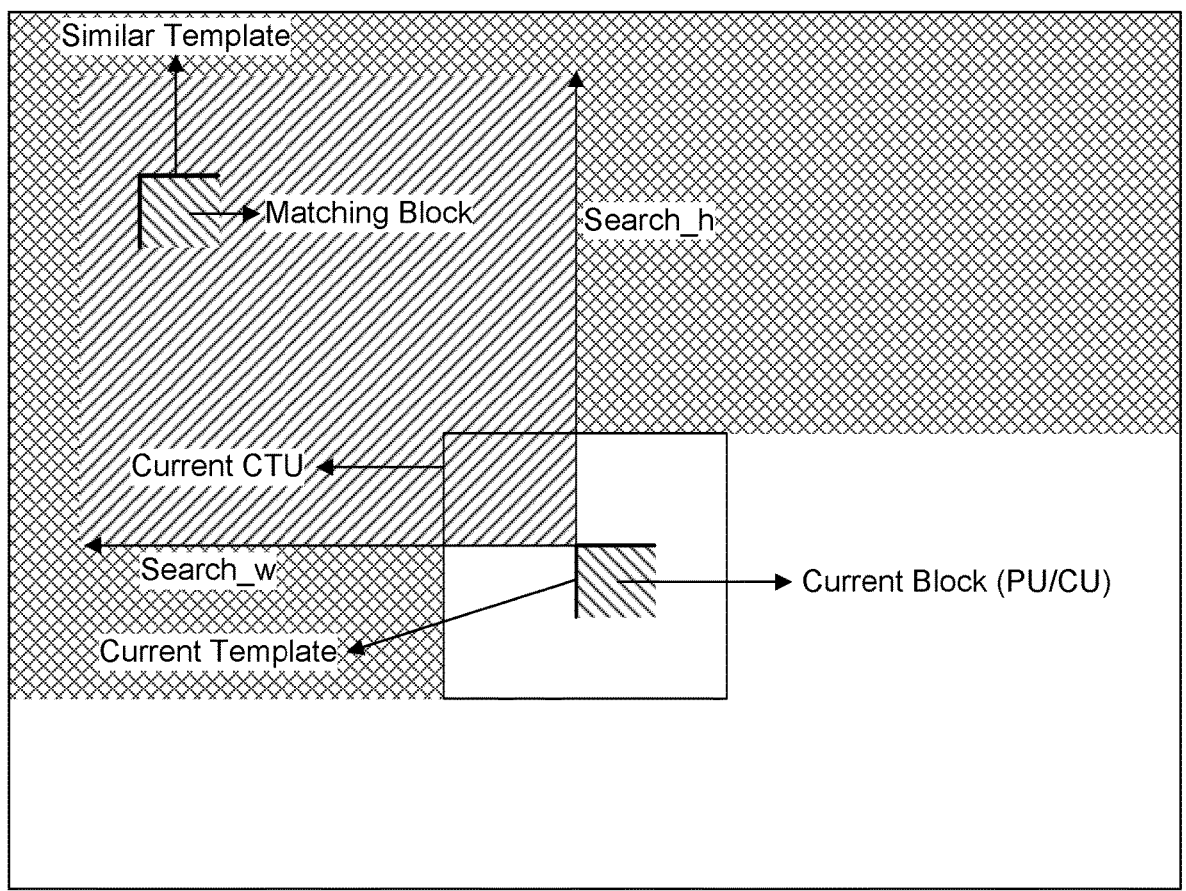
Figure 7:
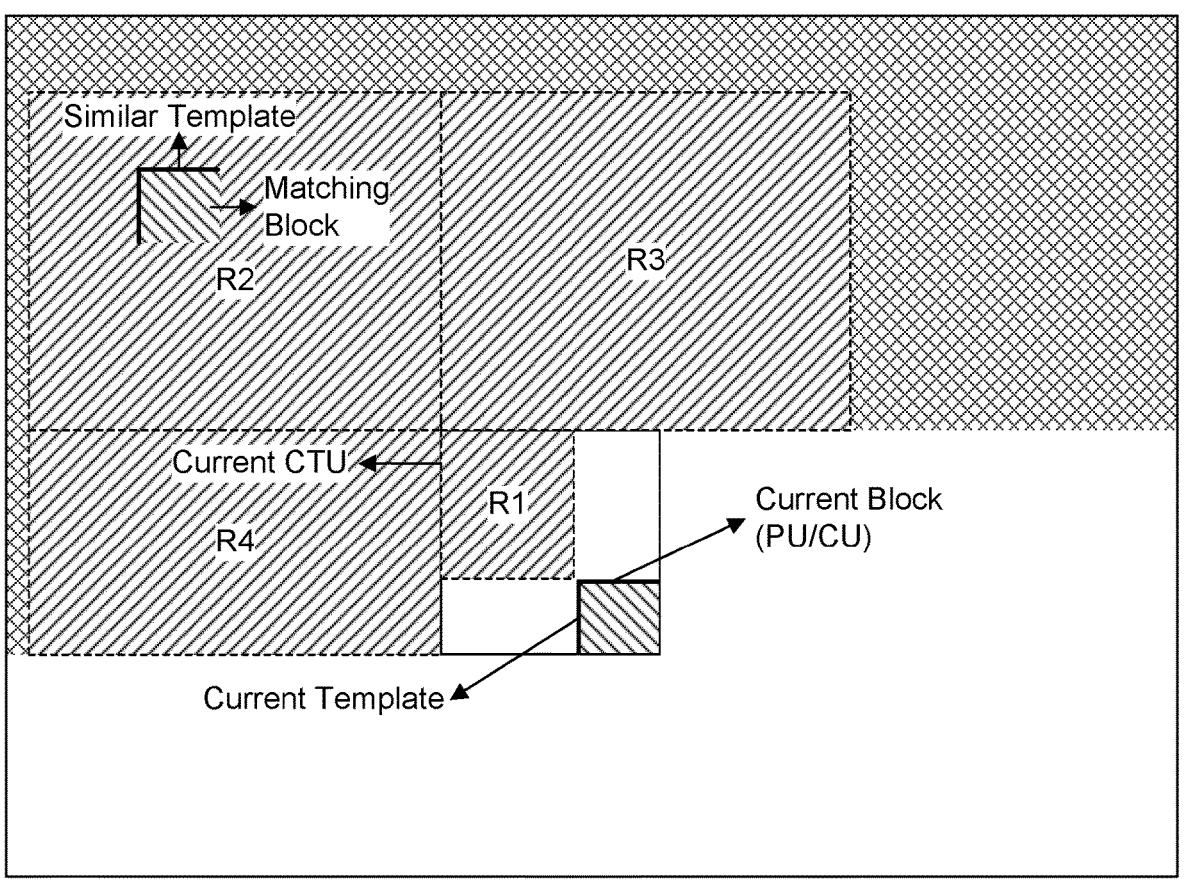
Figure 8:
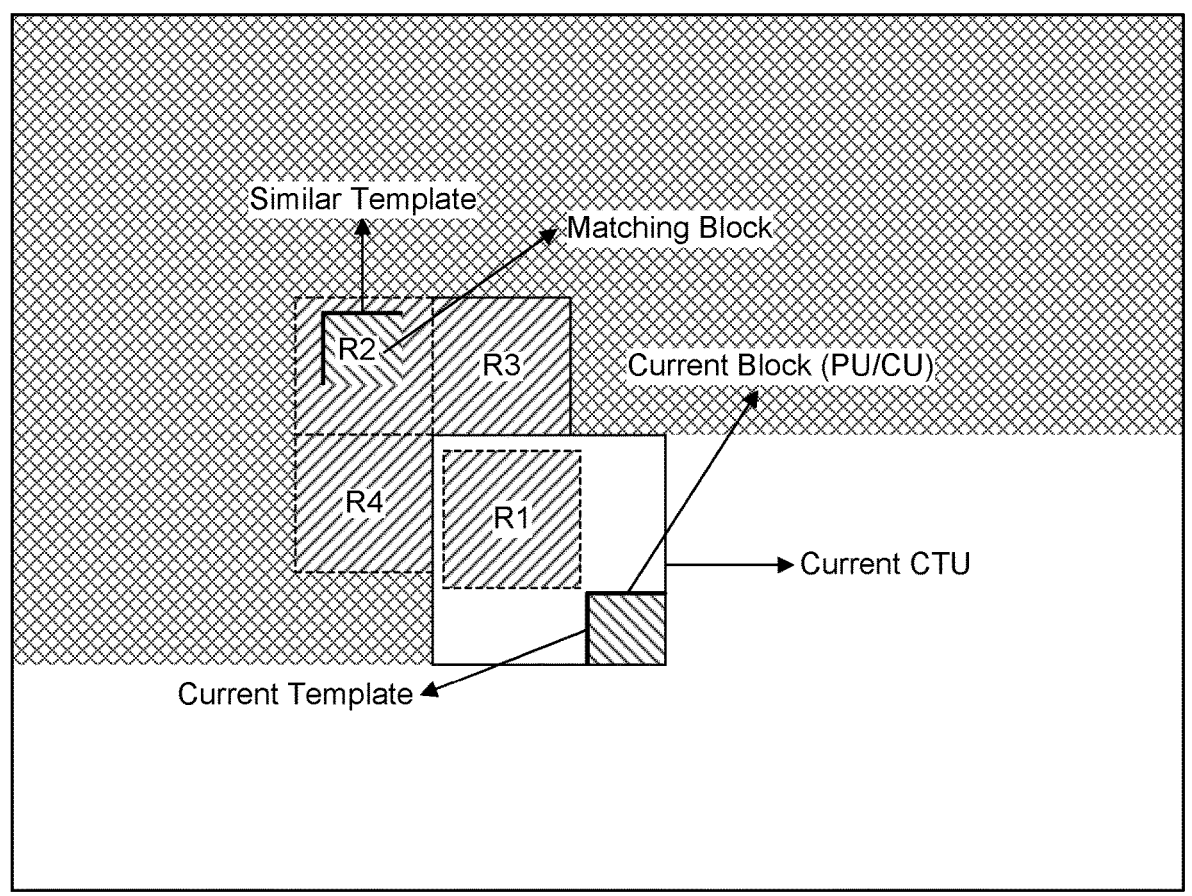
Figure 9:
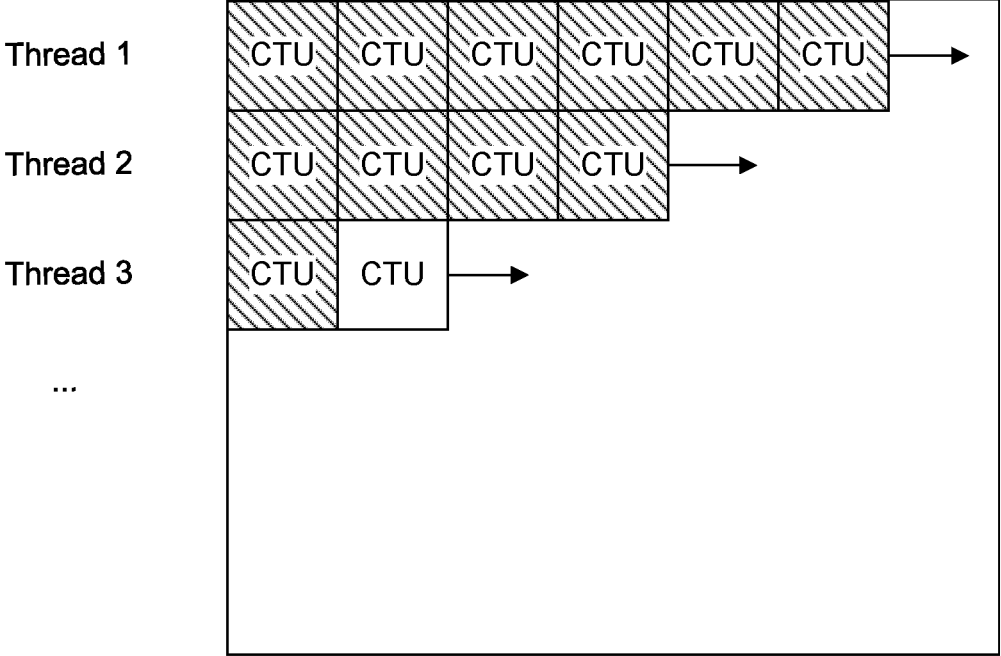
Figure 10:
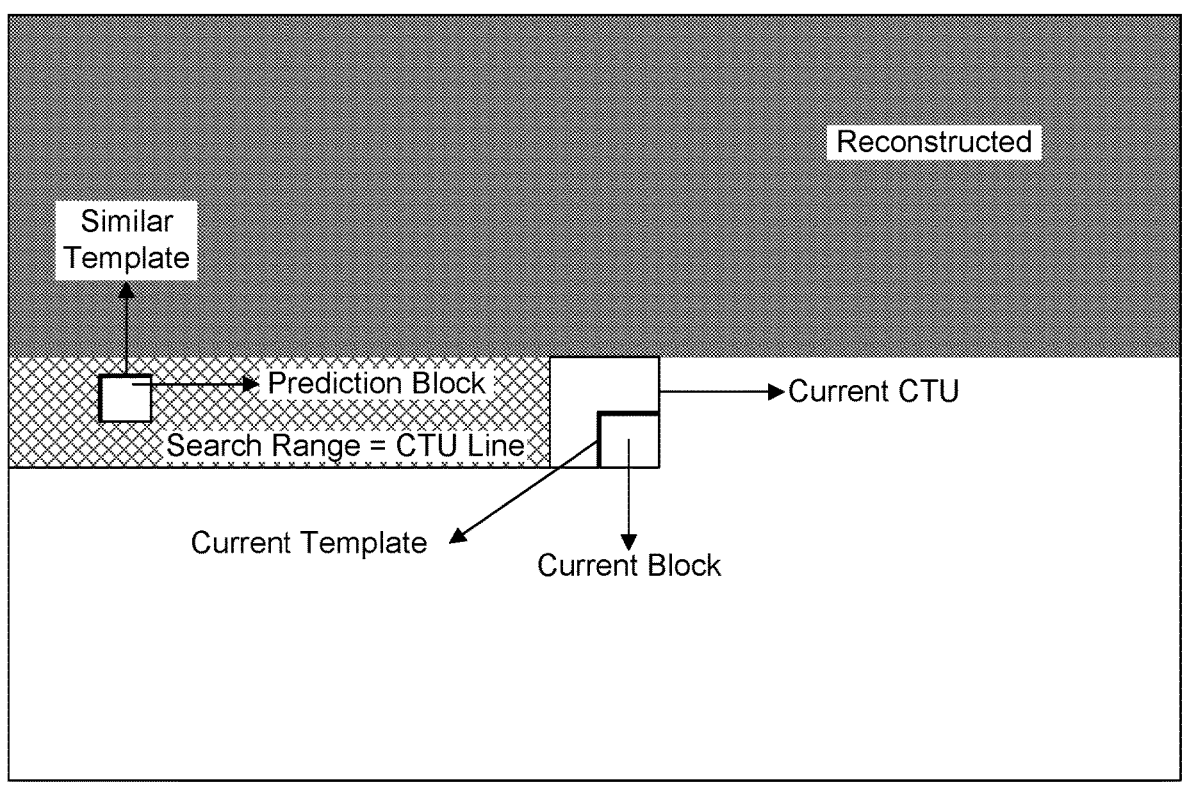
Figure 11:
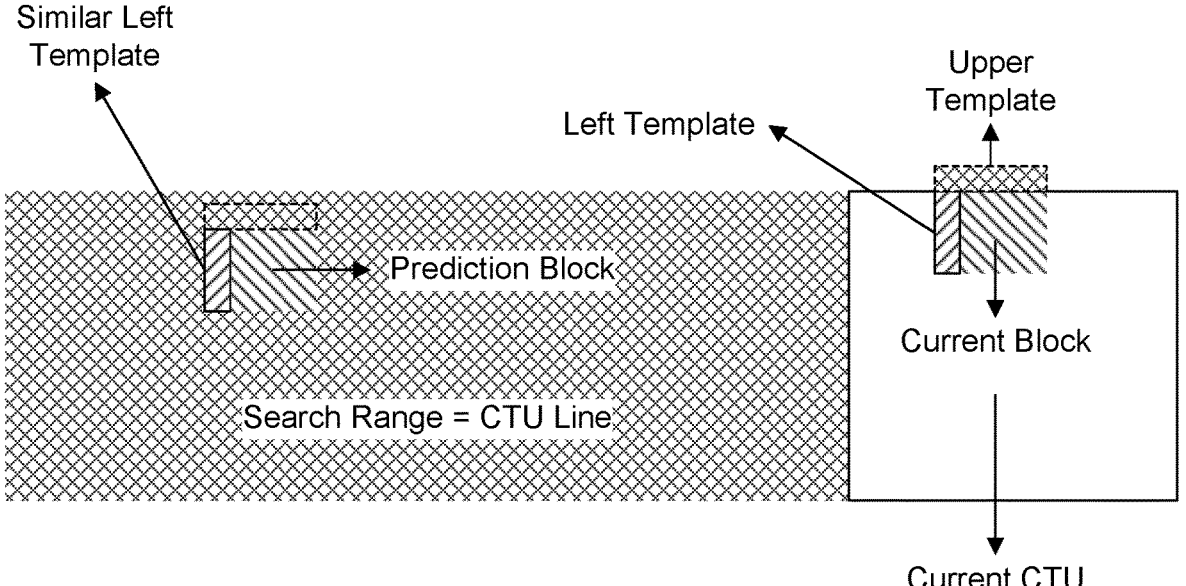
Figure 12:
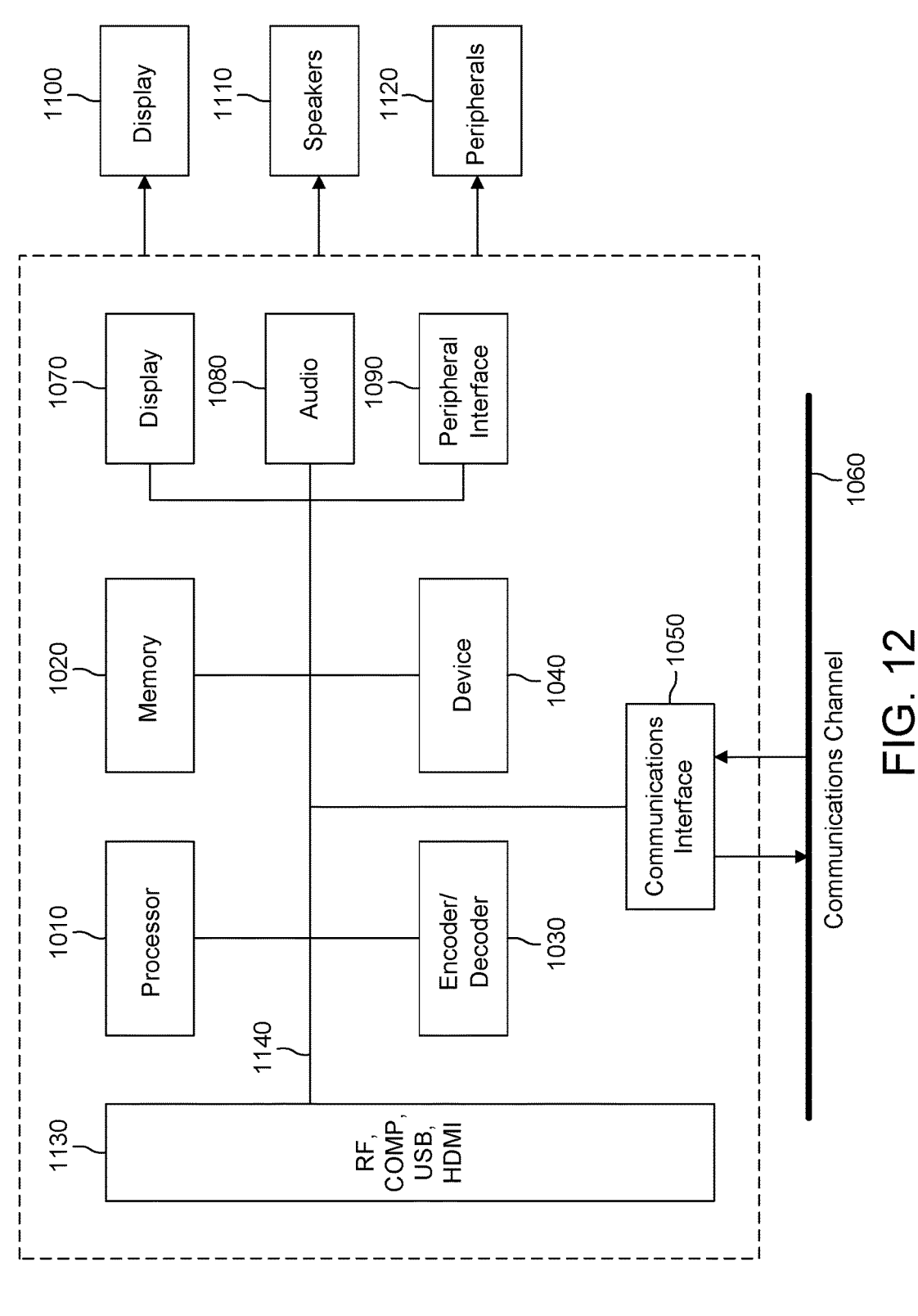
Figure 14:
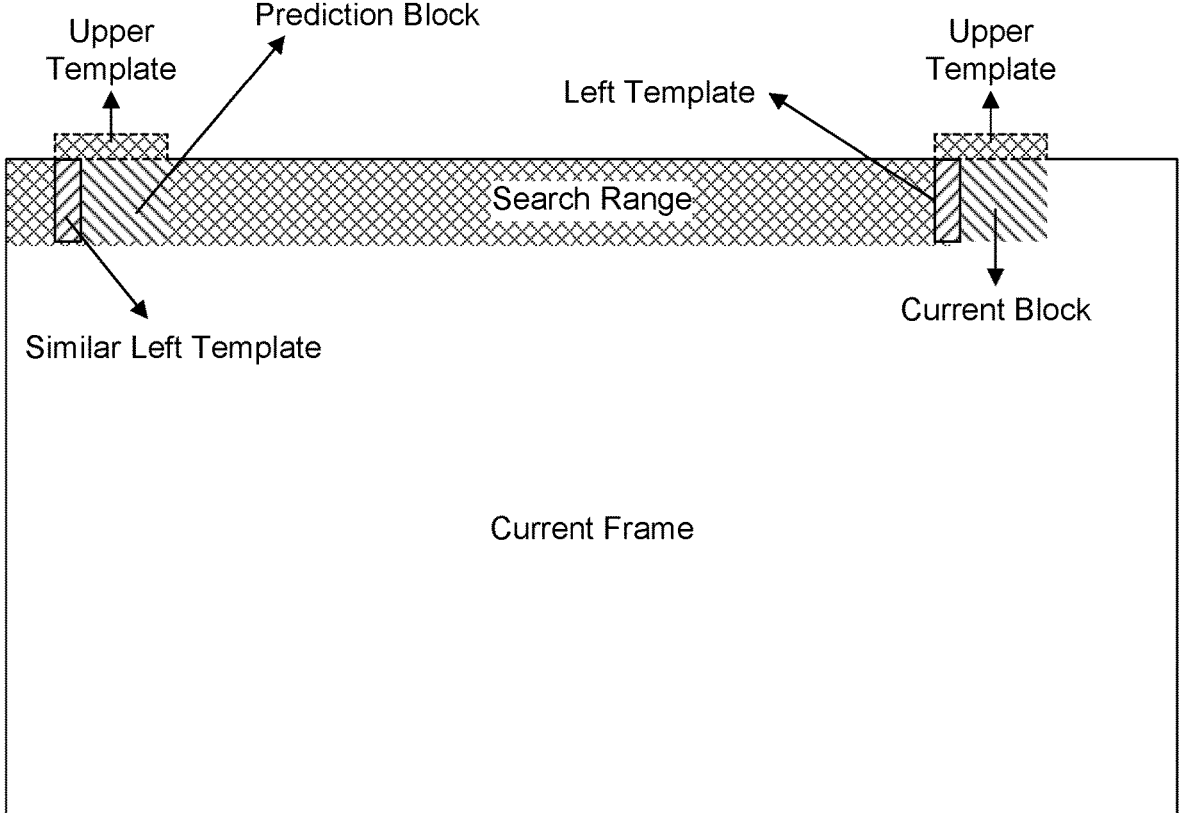
Figure 15:
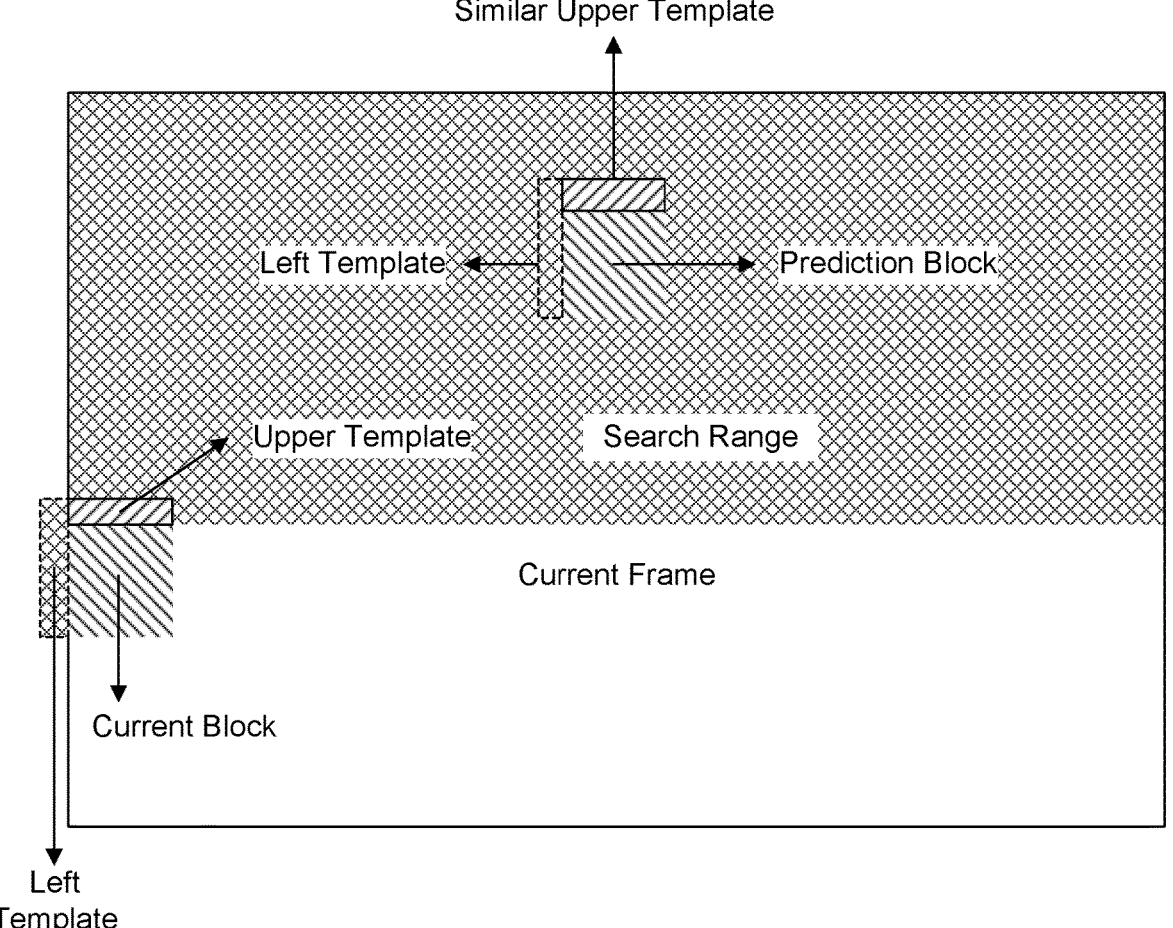

FIG. 1 illustrates, in the form of a block diagram, an example of an embodiment of an encoder, e.g., video encoder, suitable for implementing various aspects, features and embodiments described herein;

FIG. 2 illustrates, in the form of a block diagram, an example of an embodiment of a decoder, e.g., video decoder, suitable for implementing various aspects, features and embodiments described herein;

FIG. 3 illustrates intra prediction modes such as in Versatile Video Coding (VVC);

FIG. 4 illustrates an example of template matching prediction (TMP);

FIG. 5 illustrates an example of parallel processing such as wave-front parallel processing (WPP) in video coding;

FIG. 6 illustrates an example of at least one embodiment that, in general, can involve TMP with a single search region;

FIG. 7 illustrates an example of at least one embodiment that, in general, can involve TMP with multiple search regions;

FIG. 8 illustrates an example of at least one embodiment that, in general, can involve TMP with a relatively small search range wherein not all pixels inside a current coding tree unit (CTU) can be used;

FIG. 9 illustrates an example of at least one embodiment that, in general, can involve TMP with wave-front parallel processing (WPP);

FIG. 10 illustrates an example of at least one embodiment that, in general, can involve TMP with a search range limited to a current CTU line such that independent CTU line decoding is allowed;

FIG. 11 an example of at least one embodiment that, in general, can involve TMP with an upper template being neglected when it exceeds the CTU line;

FIG. 12 illustrates, in block diagram form, an example of an embodiment of apparatus or a device or a system suitable for implementing one or more embodiment, aspects or features of the present disclosure;

FIG. 13 illustrates an example of at least one embodiment in accordance with the present disclosure;

FIG. 14 illustrates an example of at least one embodiment in accordance with the present disclosure; and FIG. 15 illustrates an example of at least one embodiment in accordance with the present disclosure.

It should be understood that the drawings are for purposes of illustrating examples of various aspects, features and embodiments in accordance with the present disclosure and are not necessarily the only possible configurations. Throughout the various figures, like reference designators refer to the same or similar features.

DETAILED DESCRIPTION

As will be described in more detail below, a video codec can involve an intra prediction processing mode. One example of intra prediction can employ a template matching prediction process. Template matching prediction can be based on a template search in a particular region. At least one example of an embodiment described herein can involve template matching prediction having a fixed number of comparisons per pixel. A fixed number of comparisons per pixel can be regardless of block dimension. In at least one other embodiment, template matching prediction can involve a fixed number of comparisons regardless of block dimension and modifying the search range such that parallel processing can be performed.

One example of an approach to video coding is that provided by High Efficiency Video Coding (HEVC). More recent additions to video compression technology include various versions of the reference software and/or documentation known as the Joint Exploration Model (JEM) being developed by the Joint Video Exploration Team (JVET) as part of development of a new video coding standard known as Versatile Video Coding (VVC). The aim of JEM is to make further improvements to the existing HEVC (High Efficiency Video Coding) standard, e.g., increased coding efficiency, decreased complexity, etc.

For ease of explanation, one or more aspects and/or examples of embodiments and/or examples of features described herein may be described in the context of a particular standard such as VVC. However, reference to VVC or any other particular standard is not intended to limit, and does not limit, the scope of potential application of the various embodiments and features described herein.

Turning now to the figures, FIG. 1 illustrates an example of a video encoder 100, such as a High Efficiency Video Coding (HEVC) encoder. Variations of this encoder 100 are contemplated. However, for clarity, the encoder 100 is described below without describing all expected variations. For example, FIG. 1 may also illustrate an encoder in which improvements are made to the HEVC standard or an encoder employing technologies similar to HEVC, such as a JEM (Joint Exploration Model) encoder under development by JVET (Joint Video Exploration Team) as part of development of a new video coding standard known as Versatile Video Coding (VVC).

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In HEVC, to encode a video sequence with one or more pictures, a picture is partitioned (102) into one or more slices where each slice can include one or more slice segments. A slice segment is organized into coding units, prediction units, and transform units. The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding in HEVC, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. An illustration of division of a Coding Tree Unit (CTU) in HEVC into Coding Units (CU), Prediction Units (PU) and Transform Units (TU) is shown in FIG. 3.

In JEM, the QTBT (Quadtree plus Binary Tree) structure removes the concept of multiple partition types in HEVC, i.e., removes the separation of CU, PU and TU concepts. A Coding Tree Unit (CTU) is first partitioned by a quadtree structure. The quadtree leaf nodes are further partitioned by a binary tree structure. The binary tree leaf node is named as Coding Units (CUs), which is used for prediction and transform without further partitioning. Thus, the CU, PU and TU have the same block size in the new coding QTBT block structure. In JEM, a CU consists of blocks, i.e., Coding Blocks (CBs), of different color components.

In the present application, the term "block" can be used to refer, for example, to any of CTU, CU, PU, TU, CB, PB, and TB. In addition, the "block" can also be used to refer to a macroblock and a partition as specified in H.264/AVC or other video coding standards, and more generally to refer to an array of data of various sizes.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 2 illustrates a block diagram of a video decoder 200. In the decoder 200, a bitstream is decoded by the decoder elements as described below. Video decoder 200 generally performs a decoding pass reciprocal to the encoding pass as described in FIG. 1. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

As discussed above, in the HEVC video compression standard, a picture is divided into so-called Coding Tree Units (CTU), and each CTU is represented by a Coding Unit (CU) in the compressed domain. Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level. Intra or inter prediction is used to exploit the intra or inter frame correlation. Differences between the original block and the predicted block, often denoted as prediction errors or prediction residuals, are transformed, quantized, and entropy coded in Transform Blocks (TBs). To reconstruct the video, the compressed data are decoded by inverse processes corresponding to the entropy coding, quantization, transform, and prediction.

Intra-picture prediction is a fundamental part of image and video compression. Traditionally, the prediction signal is generated by or from the L-shaped reconstructed pixels (reference samples) to the left and/or above a current block or coding unit. During intra prediction, the reference samples are obtained based on postulating them along different angles. This mechanism is known as angular prediction. A video codec such as VVC provides for 65 intra prediction modes including 63 angles and DC and planar prediction as illustrated in FIG. 3.

The traditional intra prediction in VVC is enhanced with multiple tools:

Cross-component linear model (CCLM): the chroma prediction block is generated by linear model of luma reconstructed sample.

Multi reference line prediction (MRL): more reference samples are used to generate the prediction block.

Intra sub-partitioning (ISP): the prediction block is split to 4 subblocks sharing the same prediction mode.

Matrix weighted intra prediction (MIP): the prediction block is generated by multiplying the reference samples with some off-line optimized prediction matrices.

Intra block copy (IBC): the prediction block is generated by copying another block from the already reconstructed image part, where the displacement vectors are signaled in the bit stream.

The residual block is transformed with the core transform DCT-II, or another mode of combination of DST-VII and DCT-VIII, known as multiple transform selection (MTS). The transformed block can further be transformed with a secondary non-separable transform to further compact the residual block. This process is named low-frequency non-separable transform (LFNST).

Template matching prediction (TMP) is yet another powerful intra prediction mode that is not included in VVC. It is performed by searching one or more similar L-shaped neighborhoods (referred to as "template") to find one or more target or candidate blocks for prediction. This is illustrated in FIG. 4. If TMP is used, the current template is formed by the reconstructed L-shaped neighbors. Similar templates are found that have small differences with the current template. The blocks belonging to these templates (target blocks) are used to generate the prediction signal, either by averaging them or considering only the one that has the least template difference.

Integrating TMP in a video codec such as VVC requires proper inter-operability with the existing intra tools. Namely:

Interaction with ISP, MIP and MRL

Interaction with transform tools (MTS and LFNST, implicit MTS)

Interaction with combined inter and -intra prediction (CIIP)

In general, at least one example of an embodiment described herein addresses these interactions and enables this mode while providing an acceptable complexity/rate distortion (RD) performance trade-off, e.g., for a subsequent profile of VVC or for a new codec.

One issue that can be associated with implementing TPM comes from the number of comparisons per pixel. For a given search range, the number of comparisons for small blocks is much higher than for large blocks. This increases the complexity for small blocks, which can become the bottleneck of the coding process.

Another issue can be that TMP may perform a template search that disallows parallel processing. Namely, for wave-front parallel processing (WPP), it is required that the decoding process of CTU's is independent from CTU's that are beyond the top right one. This is indicated in FIG. 5. That is, each CTU within a given CTU line decoding ("thread" in FIG. 5) can be decoded if the top right CTU of the previous thread/line decoding is decoded. This leads to limited search range within the reconstructed part.

In general, at least one example of an embodiment described herein can involve:

defining a number of comparisons per pixel independent of, or regardless of, the block size, e.g., a fixed number or maximum number of comparisons per pixel; and/or defining a search range such that parallel processing can be performed, e.g., limiting the search range to the reconstructed frame part.

An example of an embodiment involving a number of comparisons per pixel such as a fixed number of comparisons or maximum number of comparison can provide for a single search region. As an example, a search range can be in, or limited to, a single region. An example of an embodiment can involve a single search region located at the top left of the current block (CU/PU). This provides for avoiding accessing non decoded pixels within the current CTU. The search region is illustrated in FIG. 6.

In an example of an embodiment, a number of comparisons can be determined based on, or correspond to, the search area. For example, for a search area of width "search_w" and height "search_h", search_w×search_h comparisons are made to select the best matching to block. That is, for the described example the number of comparisons per pixel (CompPerPixel) is computed as follows:

CompPerPixel=search_w×search_h/(blk_w×blk_h)

where blk_w and blk height are the width and height of the current block.

In order for CompPerPixel to be fixed, search_w/blk_w and search_h/blk_h must be fixed. In other words:

search_w=const×blk_w search_h=const×blk_h where "const" is a constant value that controls the search range. The value of "const" can be either a fixed value, or signaled through high level syntax (SPS for ex.).

At least one other example of an embodiment can involve multiple search regions or areas. Multiple search regions can possibly provide higher coding gain. An example of an embodiment of multiple search regions can involve searches based on regions or areas including one or more of reconstructed pixels of top-right and left CTU's in addition to the reconstructed pixels with the current CTU. FIG. 7 illustrates an example of multiple search regions. In the example of FIG. 7, four regions are defined as follows:

R1: inside the current CTU, starting from the current location up-left

R2: top left pixels

R3: top right pixels

R4: left pixels

Each of the search areas are defined by search range width (search_w) and search range hight (search_h). The total comparison per pixel is computed as:

CompPerPixel=4×search_w×search_h/(blk_w×blk_h)

As in the case of a single search region, to have a fixed CompPerPixel, search_w/blk_w and search_h/blk_h must be fixed. In other words:

search_w=const×blk_w search_h=const×blk_h

For small search ranges, an example of an embodiment can be based on fewer than all pixels inside the current being CTU are used, i.e., not all or a portion of or a subset of pixels inside the current CTU are used. This is illustrated by the example of an embodiment shown in FIG. 8.

In general at least one other example of an embodiment can involve template matching prediction based on providing for, or enabling, parallel process such as wave front parallel processing (WPP). In at least one example of an embodiment, to enable wave-front parallel processing (WPP), the search range shall be limited such that pixels beyond the upper right CTU of each CTU line are not accessed. That is, if the pixels are not readily available, they should not be used. FIG. 9 illustrates an example of an embodiment in which the allowed CTU to be used for TMP search are shown as shaded and the current block is located inside the white, non-shaded CTU.

In general, at least one other example of an embodiment can involve independent CTU lines. For example, it can be desirable for many real time coding processes that each CTU line is independently decodable. That is, there is no dependency between the current CTU line and the above lines. To enable TMP and have independent CTU lines, the search range can be reduced, controlled or determined such that access to above CTU lines is limited, not allowed, or disabled as illustrated by the example shown in FIG. 10.

Furthermore, in at least one other example of an embodiment, when the template exceeds the current CTU line, only the left template is considered. This happens when the vertical location of the current block is the same as CTU. This is illustrated in FIG. 11. In this case, the upper template is not used for finding the best candidate, and only the left template is used.

At least one other example of an embodiment involves a template that is a partial template. For example, when coding CUs in the first line or first column, the top or left template, respectively, is not available. This is illustrated in FIG. 14 and FIG. 15. In this case, a partial template is used for template matching prediction. In other words, if the reference template exceeds or extends beyond the frame boundary, a partial template that is inside the frame is considered. FIG. 14 illustrates an example of an embodiment where an upper template is not available. In the example of FIG. 14, only the left template is used for template matching prediction. That is, the template of the current block includes only a first area to the left of the current block, i.e., a first left template to the left of the current block, and the template associated with a second block to be used for comparison with the template of the current block includes only a second area to the left of the second block, i.e., a second left template to the left of the second block. Thus, the comparison is based on only the first and second areas to the left of the corresponding blocks, i.e., first and second left templates. FIG. 15 illustrates an example where a left template is not available. In the example of FIG. 15, only the upper template is used for template matching prediction. That is, the template of the current block includes only a first area above the current block, i.e., a first upper template above the current block, and the template associated with a second block to be used for comparison with the template of the current block includes only a second area above the second block, i.e., a second upper template above the second block. Thus, the comparison is based on only the first and second areas, i.e., first and second upper templates, above the corresponding blocks.

Another example of an embodiment involves a special case when both upper and left templates exceed the frame boundary and, therefore, neither the upper nor the left template is available. For example, this special case can occur when coding the first CU in a current frame. In this case, the prediction is considered as a DC prediction where the prediction values are set to:

$1<<(bitDepth-1)$ where bitDepth is the internal bit-depth representation.

In general, the examples of embodiments described and contemplated herein can be implemented in many different forms. FIGS. 1 and 2 described above and FIG. 12 described below provide some examples of embodiments, but other embodiments are contemplated and the discussion of FIGS. 1, 2 and 12 does not limit the breadth of the implementations. For example, at least one aspect of one or more examples of embodiments described herein generally relates to video encoding and decoding, and at least one other aspect generally relates to transmitting a bitstream generated or encoded. These and other aspects can be implemented in various embodiments such as a method, an apparatus, a computer readable storage medium having stored thereon instructions for encoding or decoding video data according to any of the methods described, and/or a computer readable storage medium having stored thereon a bitstream generated according to any of the methods described. In addition, it should be understood that the drawings provided herein, and sections of text or syntax provided herein that may relate to industry standards or standards-related documents are for purposes of illustrating examples of various aspects and embodiments and are not necessarily the only possible configurations. Also, in the present application, the terms "reconstructed" and "decoded" may be used interchangeably, the terms "pixel" and "sample" may be used interchangeably, the terms "image," "picture" and "frame" may be used interchangeably. Various methods are described herein, and each of the methods comprises one or more steps or actions for achieving the described method. Unless a specific order of steps or actions is required for proper operation of the method, the order and/or use of specific steps and/or actions may be modified or combined. Various methods and other aspects described in this application can be used to modify modules, e.g., module 160 included in the example of a video encoder embodiment 100 illustrated in FIG. 1 and module 260 included in the example of a video decoder embodiment 200 illustrated in FIG. 2. Moreover, the various embodiments, features, etc. described herein are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination. Various numeric values are used in the present application, for example, the size of maximum quantization matrix, the number of block sizes considered, etc. The specific values are for example purposes and the aspects described are not limited to these specific values.

FIG. 12 illustrates a block diagram of an example of a system in which various features and embodiments are implemented. System 1000 in FIG. 12 can be embodied as a device including the various components described below and is configured to perform or implement one or more of the examples of embodiments, features, etc. described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In general, the system 1000 is configured to implement one or more of the examples of embodiments, features, etc. described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030, e.g., to perform or implement one or more examples of embodiments, features, etc., described in this document, can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 3, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments to is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

FIG. 13 provides another example of an embodiment. In FIG. 13, at 1310 a prediction block for a current block of picture information is determined. The determination at 1310 is based on a comparison of a template associated with the current block, e.g., an L-shaped template such as that shown in FIG. 4 having a first portion to the left of the current block and a second portion above the current block, to at least one other template associated with at least one other block in an area of decoded or reconstructed picture information. The comparison can include searching for one or more templates in the area of decoded or reconstructed picture information that matches, or is a closest match, to template of the current block. The comparison can be based on a constant number of comparisons per pixel independent of the block size as described herein, e.g., with regard to FIG. 6 or 7. The block or blocks associated with the template or templates determined from the comparison are used to produce a prediction block. At 1320, the current block is decoded (or encoded) based on the prediction block.

In addition to the examples of embodiments described herein, various generalized as well as particularized embodiments are also supported and contemplated throughout this disclosure. Examples of embodiments in accordance with the present disclosure include but are not limited to the following.

In general, at least one example of an embodiment involves a method or an apparatus for video encoding or decoding comprising providing an intra prediction processing mode employing template matching prediction based on a search range determined as described herein.

At least one example of an embodiment can involve a method or an apparatus for video encoding or decoding comprising providing an intra prediction processing mode employing template matching prediction based on a template search having a fixed number of comparisons per pixel, regardless of block dimension.

At least one example of an embodiment can involve a method or an apparatus for video encoding or decoding comprising providing an intra prediction processing mode employing template matching prediction based on a template search having a fixed number of comparisons per pixel, regardless of block dimension, and modifying the search range such that parallel processing can be performed.

At least one example of an embodiment can involve apparatus comprising: one or more processors configured to determine a prediction block for a current block of picture information based on a comparison of a template associated with the current block to at least one other template associated with at least one other block in an area of decoded picture information, wherein the comparison is based on a constant number of comparisons per pixel independent of a size of the current block; and decoding the current block based on the prediction block.

At least one example of an embodiment can involve a method comprising: determining a prediction block for a current block of picture information based on a comparison of a template associated with the current block to at least one other template associated with at least one other block in an area of decoded picture information, wherein the comparison is based on a constant number of comparisons per pixel independent of a size of the current block; and decoding the current block based on the prediction block.

At least one example of an embodiment can involve apparatus comprising: one or more processors configured to determine a prediction block for a current block of picture information based on a comparison of a template associated with the current block to at least one other template associated with at least one other block in an area of reconstructed picture information, wherein the comparison is based on a constant number of comparisons per pixel independent of a size of the current block; and encoding the current block based on the prediction block.

At least one example of an embodiment can involve a method comprising: one or more to processors configured to determine a prediction block for a current block of picture information based on a comparison of a template associated with the current block to at least one other template associated with at least one other block in an area of reconstructed picture information, wherein the comparison is based on a constant number of comparisons per pixel independent of a size of the current block; and encoding the current block based on the prediction block.

At least one example of an embodiment can involve a method or apparatus as described herein, wherein the constant number of comparisons per pixel is one of a fixed value or a value signaled through a high-level syntax information.

At least one example of an embodiment can involve a method or apparatus as described herein, wherein the area within which the at least one other template occurs comprises a region above and to the left of the current block.

At least one example of an embodiment can involve a method or apparatus as described herein, wherein the area within which the at least one other template occurs comprises a plurality of regions including a first region including pixels above and to the left of the current block and within a current CTU including the current block, a second region including pixels above and to the left of the current CTU, a third region including pixels above and to the right of the current CTU, and a fourth region comprising pixels to the left of the current CTU.

At least one example of an embodiment can involve a method or apparatus as described herein, wherein the area within which the at least one other template occurs comprises a region selected to enable wave-front parallel processing.

At least one example of an embodiment can involve a method or apparatus as described herein, wherein the area within which the at least one other template occurs comprises a region selected to enable independent decoding of each CTU line.

At least one example of an embodiment can involve a method or apparatus as described herein, wherein the region is selected such that decoding requires no access to CTU lines above a CTU line including the current block.

At least one example of an embodiment can involve a method or apparatus as described herein, wherein the template associated with the current block comprises a first portion to the left of the current block and a second portion above the current block, and the comparison is based on only the first portion when the second portion extends above a CTU line including the current block.

At least one example of an embodiment can involve a device including an apparatus as described herein and at least one of (i) an antenna configured to receive a signal, the signal including data representative of the image information, (ii) a band limiter configured to limit the received signal to a band of frequencies that includes the data representative of the image information, and (iii) a display configured to display an image from the image information.

At least one example of an embodiment can involve a device as described herein, wherein the device comprises one of a television, a television signal receiver, a set-top box, a gateway device, a mobile device, a cell phone, a tablet, a computer, a laptop, or other electronic device.

In general, another example of an embodiment can involve a bitstream or signal formatted to include syntax elements and picture information, wherein the syntax elements are produced and the picture information is encoded by processing based on any one or more of the examples of embodiments of methods in accordance with the present disclosure.

In general, one or more other examples of embodiments can also provide a computer readable storage medium, e.g., a non-volatile computer readable storage medium, having stored thereon instructions for encoding or decoding picture information such as video data according to the methods or the apparatus described herein. One or more embodiments can also provide a computer readable storage medium having stored thereon a bitstream generated according to methods or apparatus described herein. One or more embodiments can also provide methods and apparatus for transmitting or receiving a bitstream or signal generated according to methods or apparatus described herein.

Many of the examples of embodiments described herein are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the embodiments, features, etc. can be combined and interchanged with others described in earlier filings as well.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

In general, the examples of embodiments, implementations, features, etc., described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. One or more examples of methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users. Also, use of the term "processor" herein is intended to broadly encompass various configurations of one processor or more than one processor.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Various embodiments are described herein. Features of these embodiments can be provided alone or in any combination, across various claim categories and types. Further, embodiments can include one or more of the following features, devices, or aspects, alone or in any combination, across various claim categories and types:

providing for video encoding and/or decoding comprising determining a prediction block for a current block of picture information based on a comparison of a template associated with the current block to at least one other template associated with at least one other block in an area of decoded picture information, wherein the comparison is based on a constant number of comparisons per pixel independent of a size of the current block; and encoding/decoding the current block based on the prediction block.

providing for video encoding and/or decoding as described herein wherein the constant number of comparisons per pixel is one of a fixed value or a value signaled through a high-level syntax information;

providing for video encoding and/or decoding as described herein, wherein the area within which the at least one other template occurs comprises a region above and to the left of the current block;

providing for video encoding and/or decoding as described herein, wherein the area within which the at least one other template occurs comprises a plurality of regions including a first region including pixels above and to the left of the current block and within a current CTU including the current block, a second region including pixels above and to the left of the current CTU, a third region including pixels above and to the right of the current CTU, and a fourth region comprising pixels to the left of the current CTU;

providing for video encoding and/or decoding as described herein, wherein the area within which the at least one other template occurs comprises a region selected to enable wave-front parallel processing;

providing for video encoding and/or decoding as described herein, wherein the area within which the at least one other template occurs comprises a region selected to enable independent decoding of each CTU line;

providing for video encoding and/or decoding as described herein, wherein the region is selected such that decoding requires no access to CTU lines above a CTU line including the current block;

providing for video encoding and/or decoding as described herein, wherein the template associated with the current block comprises a first portion to the left of the current block and a second portion above the current block, and the comparison is based on only the first portion when the second portion extends above a CTU line including the current block;

providing for a bitstream or signal that includes one or more of the described syntax elements, or variations thereof;

providing for a bitstream or signal that includes syntax conveying information generated according to any of the embodiments described;

providing for inserting in the signaling syntax elements that enable the decoder to operate in a manner corresponding to that used by an encoder;

inserting in the signaling syntax elements that enable the encoder and/or decoder to provide encoding and/or decoding in accordance with any of the embodiments, features or entities, alone or in any combination, as described herein.

selecting, based on these syntax elements, the features or entities, alone or in any combination, as described herein to apply at the decoder;

providing for creating and/or transmitting and/or receiving and/or decoding a bitstream or signal that includes one or more of the described syntax elements, or variations thereof;

providing for creating and/or transmitting and/or receiving and/or decoding a bitstream according to any of the embodiments described;

a method, process, apparatus, medium storing instructions, medium storing data, or signal according to any of the embodiments described;

a TV, set-top box, cell phone, tablet, or other electronic device that provides for applying encoding and/or decoding according to any of the embodiments, features or entities, alone or in any combination, as described herein;

a TV, set-top box, cell phone, tablet, or other electronic device that performs encoding and/or decoding according to any of the embodiments, features or entities, alone or in any combination, as described herein, and that displays (e.g. using a monitor, screen, or other type of display) a resulting image;

a TV, set-top box, cell phone, tablet, or other electronic device that tunes (e.g. using a tuner) a channel to receive a signal including an encoded image, and performs encoding and/or decoding according to any of the embodiments, features or entities, alone or in any combination, as described herein;

a TV, set-top box, cell phone, tablet, or other electronic device that receives (e.g. using an antenna) a signal over the air that includes an encoded image, and performs encoding and/or decoding according to any of the embodiments, features or entities, alone or in any combination, as described herein;

a computer program product storing program code that, when executed by a computer encoding and/or decoding in accordance with any of the embodiments, features or entities, alone or in any combination, as described herein.

a non-transitory computer readable medium including executable program instructions causing a computer executing the instructions to implement encoding and/or decoding in accordance with any of the embodiments, features or entities, alone or in any combination, as described herein.

The invention claimed is:

1. An apparatus comprising: one or more processor configured for: determining a prediction block for a current block of picture information based on a comparison a template associated with the current block to at least one other template associated with at least one other block in an area of decoded picture information, wherein the comparison is based on a constant number of comparisons per pixel independent of a size of the current block, wherein the area within which the at least one other template occurs comprises a region selected to enable wave-front parallel processing; and decoding the current block based on the predicted block.

2. An apparatus comprising: one or more processors configured to:

determine a prediction block for a current block of picture information based on a comparison of a template associated with the current block to at least one other template associated with at least one other block in an area of decoded picture information, wherein the comparison is based on a constant number of comparisons per pixel independent of a size of the current block, wherein the template of the current block includes only a first left template to the left of the current block, and the at least one other template of the at least one other block includes only a second left template to the left of the at least one other block, and the comparison is based on only the first left template and the second left template; and decoding the current block based on the prediction block.

3. A method comprising:

determining a prediction block for a current block of picture information based on a comparison of a template associated with the current block to at least one other template associated with at least one other block in an area of decoded picture information, wherein the comparison is based on a constant number of comparisons per pixel independent of a size of the current block, wherein the area within which the at least one other template occurs comprises a region selected to enable wave-front parallel processing; and, decoding the current block based on the prediction block.

4. A method comprising, determining a prediction block for a current block of picture information based on a comparison of a template associated with the current block to at least one other template associated with at least one other block in an area of decoded picture information, wherein the comparison is based on a constant number of comparisons per pixel independent of a size of the current, wherein the area within which the at least one other template occurs comprises a region selected to enable wave-front parallel processing; and, encoding the current block based on the prediction block.

* * * * *